US006752384B2

(12) United States Patent
Matheson

(10) Patent No.: US 6,752,384 B2
(45) Date of Patent: Jun. 22, 2004

(54) APPARATUS AND METHOD FOR HANDLING CABLES

(75) Inventor: Edward Craig Matheson, Aberdeen (GB)

(73) Assignee: Rockwater Limited (GB)

( * ) Notice: Subject to any disclaimer, the term of this patent is extended or adjusted under 35 U.S.C. 154(b) by 0 days.

(21) Appl. No.: 10/204,175

(22) PCT Filed: Feb. 19, 2001

(86) PCT No.: PCT/GB01/00695

§ 371 (c)(1), (2), (4) Date: Oct. 23, 2002

(87) PCT Pub. No.: WO01/60732

PCT Pub. Date: Aug. 23, 2001

(65) Prior Publication Data

US 2003/0150201 A1 Aug. 14, 2003

(30) Foreign Application Priority Data

Feb. 17, 2000 (GB) .............................................. 0003754

(51) Int. Cl.$^7$ .......................... B66D 1/00; H02G 11/00; B65H 78/38

(52) U.S. Cl. ...................... 254/266; 191/12.2; 242/406; 414/918

(58) Field of Search ................................ 254/334, 335, 254/266, 251, 332; 212/271, 279, 238, 240, 243, 251, 332; 191/12 R, 12.2, 12.4; 242/439, 439.4, 441, 441.2, 406; 294/65.5, 64.1; 414/918

(56) References Cited

U.S. PATENT DOCUMENTS

| | | | | | |
|---|---|---|---|---|---|
| 413,629 | A | * | 10/1889 | Phillips | 242/441.2 |
| 4,609,989 | A | * | 9/1986 | Squarci | 700/122 |
| 4,610,403 | A | * | 9/1986 | Goekler et al. | 242/439.5 |
| 4,891,981 | A | * | 1/1990 | Schonfeld | 73/460 |
| 5,791,134 | A | * | 8/1998 | Schneider et al. | 57/6 |
| 5,979,288 | A | * | 11/1999 | Gallagher et al. | 87/36 |
| 6,032,448 | A | * | 3/2000 | Baker et al. | 57/10 |
| 6,190,780 | B1 | * | 2/2001 | Shoji et al. | 428/472 |
| 6,471,188 | B2 | * | 10/2002 | Crawford | 254/266 |

FOREIGN PATENT DOCUMENTS

| | | |
|---|---|---|
| FR | 1583350 A | 10/1969 |
| WO | WO 9622935 A | 8/1996 |

* cited by examiner

*Primary Examiner*—Emmanuel Marcelo
(74) *Attorney, Agent, or Firm*—Haynes and Boone, LLP

(57) ABSTRACT

Apparatus for handling cables is disclosed. The apparatus comprises means (10, 12, 16, 18) to pay out a service cable (20) and a support cable (14) so that the service cable (20) and the support cable (14) are adjacent, and means to (26, 28) wrap a further cable (22) around the service and support cables (20, 14).

23 Claims, 1 Drawing Sheet

APPARATUS AND METHOD FOR HANDLING CABLES

Figure 1:
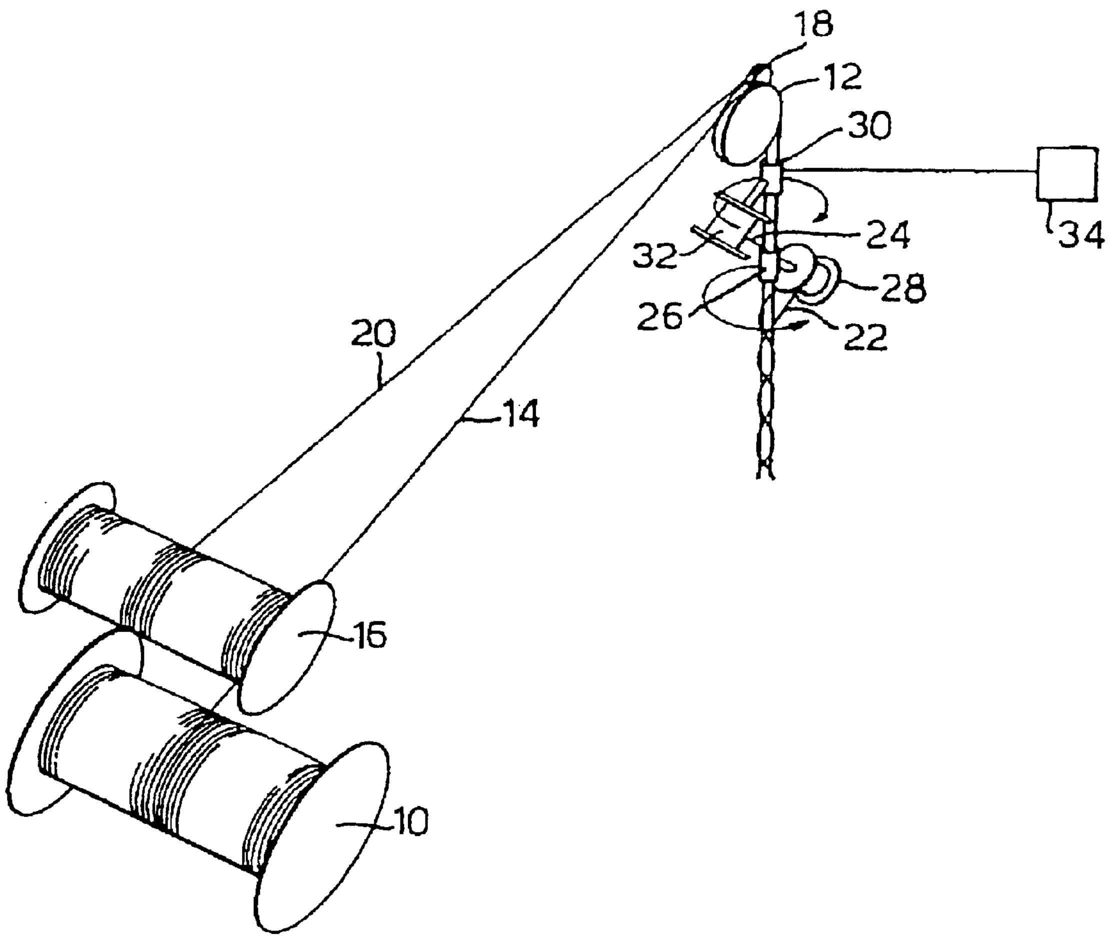

The present invention relates to an apparatus and a method for handling cables. More specifically, the invention relates to apparatus and a method, which are useful for deploying and retrieving equipment in subsea and subsurface locations using cables.

All underwater remotely operated vehicles (ROVs) rely on an umbilical for power and signals transmission to and from the surface support vessel. The umbilical must also be capable of supporting the mass of the ROV during launch and recovery operations (dynamic factors can result in a five fold increase in mass). As the operating depth increases the umbilical design has to take account of the weight of the cable deployed and launch mass problems become less of an issue.

For this reason, traditional ROV armoured umbilicals have been constructed as a composite of copper wires wrapped in an outer steel wire braid with a fibre optic core. The 'braid' provides the umbilical with enough strength to withstand the high loads placed on the umbilical.

There are a number of problems associated with this approach. The umbilical is stiff and hard to deflect. It has a fixed internal configuration, which cannot be altered. The steel strength members corrode with time. The delicate fibre optic cores become damaged with use rendering the entire umbilical useless. Furthermore, the minimum bend diameter is large, requiring large sheave wheels, winches etc.

However, the most significant drawback is weight. This may not be so much of a problem in shallower waters but as depth increases the weight of cable deployed becomes more significant until a point is reached where the cable can no longer support the deployed load and its own weight. For this reason it is generally recognised that 3000 metres is the practical limit for this type of umbilical.

In EP-0805776 there is described an alternative approach which does not rely on the use of a steel armoured umbilical. This specification discloses an apparatus in which a conventional underwater service cable is wrapped around a load-bearing rope during deployment. The service line is subsequently unwrapped when the rope is recovered. This apparatus requires that the winch for the service cable must rotate around the load-bearing rope, and this results in a complicated structure.

We have now found a way to avoid the problems in the prior art, which involves wrapping a further line around a support line and a service line. In accordance with the invention we provide an apparatus and method for achieving this.

Thus, according to one aspect of the invention we provide apparatus for handling cables, comprising means to pay out a service cable and support cable so that the service cable and the support cable are adjacent, and means to wrap a further cable around the service and support cables.

The means for paying out the support cable may comprise a winch, and usually also includes a sheave. Similarly, the means for paying out the service cable may comprise a winch, and usually also includes a sheave. The arrangement is preferably such that the sheaves guide the service and support cables so that they extend substantially vertically, in juxtaposition with one another, so that the further cable can be wrapped around them. As the service and support cables are paid out they will move axially while the further cable is being wrapped around them.

The winch for the service cable may relatively light duty (compared with the support cable winch). The cables can each be wrapped around their respective winches to facilitate storage. Appropriate slip rings may be fitted to facilitate continuity during deployment and recovery.

The means for wrapping the further cable may comprise a tubular member through which the service and support cables extend in juxtaposition, and a winch secured to the tubular member for paying out the further cable. The winch and the tubular member are preferably rotatable about the service and support cables so that the further cable is wrapped around the service and support cables during rotation of said winch and tubular member. Drive means can be provided to drive the winch and the tubular member around the service and support cables. The winch and tubular member may be rotated in one direction to wrap the further cable around the service and support cables (for deployment), and may be rotatable in an opposition direction to unwrap the further cable from the service and support cables (for retrieval).

Preferably there is more than one of said further cables wrapped around the service and support cables, and most preferably two of said further cables are used. Each further cable may be provided with its own tubular member, winch and drive means. However, if desired, a common drive means can be provided for rotating the winch and tubular member of the first and second further cables (and any other further cable).

Preferably one of the further cables is wrapped around the service and support cables in one direction, and another of the further cables is wrapped around the service and support cables in an opposite direction, so as to braid the service and support cables with the further cables.

Preferably, the winches of the first and second tubular members are geared so that they rotate around the service and support cables in synchrony.

Preferably means is provided for increasing or decreasing the speed of rotation of the or each further cable.

Preferably means is provided to adjust the tension of the or each further cable as it is wrapped around the service and support cables.

The service cable may be designed to carry power and/or data, for example, to a subsea or subsurface location. Usually the power and/or data will be carried to subsea or subsurface equipment, such as an underwater ROV. The service cable may be entirely conventional and may include one or more electrical, fibre optic, hydraulic and/or pneumatic lines. More than one service cable may be used, in which case the further cable is preferably wrapped around all the service cables—in this embodiment, each service cable would usually be provided with its own winch and sheave. The service cable may be of the type of cable known in the art as an "umbilical".

The support cable may be a load bearing cable adapted to support its own weight and the weight of the service cable(s). It is particularly preferred that the support cable is specially adapted for use in lifting operations. The support cable may be a metallic material, such as steel, or may be a plastics material. Preferably, the support cable is a synthetic fibre rope such as ultra high molecular weight polyethylene. The support cable may be KEVLAR (registered trade mark). The support cable may be provided with reinforcement. The support cable may be often the type known in the art as a "lift" cable.

The or each further cable may be the same as the support cable. Typically, however, the or each support cable would be of lighter duty than the support cable. Thus, the or each further cable may be a metallic material, such as steel, or may be a plastics material. The or each further cable may be a synthetic fibre rope such as ultra high molecular weight polyethylene. The or each further cable may be KEVLAR (registered trade mark).

According to another aspect of the invention we provide a method for handling cables, comprising paying out a service cable and a support cable so that the service cable and the support cable are adjacent, and wrapping a further cable around the service and support cables.

Preferably two of said further cables are wrapped around the service and support cables, one of the further cables being wrapped around the service and support cables in one direction and the other of the further cables being wrapped around the service and support cables in an opposite direction, so as to braid the service and support cables with the further cables.

The present invention facilitates the deployment of a subsea 'package' with multiple service lines which are dynamically 'braided' to the main support line as the package is deployed or recovered.

During recovery operations, the further cable can be 'undone' by reversing the direction of rotation of the winch carrying it. The further cable may then be recovered back onto a storage reel which forms part of the winch.

The present invention is very flexible, allowing easy replacement of service lines in the event of damage. It allows braiding of any type of service line (including a multitude of service lines) to any type of lift line over any distance. Furthermore, more than one lift line can be provided, if desired, usually with its own sheave and winch arrangement. The invention allows the use of low density, high strength support lines to increase the deployment depth capability beyond conventional umbilicals to full ocean depth.

Existing equipment can easily be adapted for use with the invention. Control system service lines could be attached to flexible flowlines as they are laid in field. Riser, service lines, returns line etc. could be braided together as they are deployed during subsea well intervention operations.

The invention also offers significant advantages over the invention described in EP-0805771. For example, no complex rotating service winches with multiple slip rings are required: a conventional deck mounted service winch will do. Thus, the rotating assemblies can be much smaller. Furthermore, the invention can cater for larger number and diversity of service lines, and is more readily adaptable to alternative service line types.

Reference is now made to the accompanying drawing, which is a schematic perspective view illustrating the apparatus and method according to the present invention.

In FIG. 1 a support cable winch 10 and a support cable sheave 12 are provided for paying out a support cable 14 which is typically a lifting rope. A service cable winch 16 and a service cable sheave 18 are provided for paying out a service cable in the form of umbilical 20. The sheaves 12 and 18 are arranged to feed the service and support cables 20,14 substantially vertically in juxtaposition with one another.

The service and support cables 20,14 are fed to a "braiding" unit which braids two further cables 22 and 24 around the service and support cables 20,14. The braiding apparatus includes a tubular member 26 and winch 28 for wrapping the further cable 22 around the service and support cables 20,14. The braiding apparatus further includes a tubular member 30 and winch 32 for wrapping the further cable 24 around the service and support cables 20,14. Drive means 34 is provided for rotating the tubular member 26 and winch 28 around the service and support cables 20,14 in a clockwise direction. The drive means 34 may also serve to rotate the tubular member 30 and winch 32 around the service and support cables 20,14 in an anticlockwise direction, or, alternatively, as separate drive means (not shown) may be provided for this purpose.

Thus, the braiding unit consists of two contra-rotating high capacity reels (i.e. the winches 28 and 32) of a small diameter braiding line. The reels 28,32 are preferably driven such that the braid line is constantly in tension. As the service and support cables 20,14 move axially downward, the reels 28,32 are driven around, paying out the further cables 22,24 and binding the service cable 20 to the main lift cable 14 and forming a bundle in a similar fashion to rope manufacturing equipment. Both reels 28,32 are mechanically geared together such that each rotates around the bundle in synchrony (this helps to avoid entanglement). Increasing or decreasing the speed of rotation of the braiding unit, relative to the rate of bundle throughput, will result in different weave rates. Similarly, increasing the braiding reel back tension will result in a tighter weave.

It will be appreciated that the invention described above may be modified.

What is claimed is:

1. Apparatus for handling cables, comprising a first winch containing a first cable, a first sheath for receiving the first cable to allow the first cable to pay out from the first winch and over the first sheath, a second winch containing a second cable, a second sheath located adjacent the first sheath for receiving the second cable to allow the second cable to pay out from the second winch and over the second sheath and in a juxtapositional relation to the first cable, and a wrapping mechanism for wrapping a third cable around the juxapositioned first and second cables as they pass from the first and second sheaths, respectively.

2. The apparatus of claim 1 wherein the wrapping mechanism comprises a tubular member through which the first and second cables extend in juxtaposition, and a third winch secured to the tubular member for paying out the third cable.

3. The apparatus of claim 2, wherein the tubular member and the third winch are rotatable about the juxtapositioned first and second cables as the first and second cables pass from the first and second sheaths, respectively, so that the third cable is wrapped around the first and second cables during rotation of the third winch and the tubular member.

4. The apparatus of claim 1, wherein the speed with which the third cable is wrapped around the first and second cables is variable.

5. The apparatus of claim 1, wherein the tension of the third cable as it is wrapped around the first and second cables is variable.

6. The apparatus of claim 1, further comprising a fourth cable, and an additional wrapping mechanism for wrapping the fourth cable around the juxtapositioned first and second cables.

7. The apparatus of claim 6 wherein the additional wrapping mechanism comprises an additional tubular member through which the first and second cables extend in juxtaposition, and a fourth winch secured to the additional tubular member for paying out the fourth cable.

8. The apparatus of claim 7, wherein the additional tubular member and the fourth winch are rotatable about the juxtapositioned first and second cables as the first and second cables pass from the first and second sheaths, respectively, so that the fourth cable is wrapped around the first and second cables during rotation of the fourth winch and the additional tubular member.

9. The apparatus of claim 6, wherein the speed with which the fourth cable is wrapped around the first and second cables is variable.

10. The apparatus of claim 6, wherein the tension of the fourth cable as it is wrapped around the first and second cables is variable.

11. The apparatus of claim 6 wherein the additional wrapping mechanism wraps the fourth cable in a direction opposite to the direction of rotation of the third cable so that the third and fourth cables are braided around the first and second cables.

12. The apparatus of claim 1 wherein the first cable is a service cable and the second cable is a support cable.

13. A method for handling cables, comprising allowing a first cable to pay out from a first winch and over a first sheath, allowing a second cable to pay out from a second winch and over a second sheath and in a juxtapositional relation to the first cable, and wrapping a third cable around the juxapositioned first and second cables as they pass from the first and second sheaths, respectively.

14. The method of claim 13 further comprising passing the first and second cables in juxtaposition through a tubular member as they pass from the first and second cables, respectively, and paying out the third cable from a third winch secured to the tubular member.

15. The method of claim 14, further comprising rotating the tubular member and the third winch about the juxtapositioned first and second cables as the first and second cables pass from the first and second sheaths, respectively, so that the step of wrapping is done during the step of rotating.

16. The method of claim 13, further comprising varying the speed with which the third cable is wrapped around the first and second cables.

17. The method of claim 13, further comprising varying the tension of the third cable as it is wrapped around the first and second cables.

18. The method of claim 13, further comprising wrapping a fourth cable around the juxtapositioned first and second cables.

19. The method of claim 18 further comprising passing the first and second cables in juxtaposition through an additional tubular member as they pass from the first and second cables, respectively, and paying out the fourth cable from a fourth winch secured to the tubular member.

20. The method of claim 19, further comprising rotating the tubular member and the fourth winch about the juxtapositioned first and second cables as the first and second cables pass from the first and second sheaths, respectively, so that the fourth cable is wrapped during the step of rotating.

21. The method of claim 18, further comprising varying the speed with which the fourth cable is wrapped around the first and second cables.

22. The method of claim 18, further comprising varying the tension of the fourth cable as it is wrapped around the first and second cables.

23. The method of claim 18 wherein the fourth cable is wrapped in a direction opposite to the direction of rotation of the third cable so that the third and fourth cables are braided around the first and second cables.

* * * * *